(12) United States Patent
Nolte et al.

(10) Patent No.: US 11,151,529 B1
(45) Date of Patent: *Oct. 19, 2021

(54) METHODS AND SYSTEMS FOR SYSTEMATIC RECOGNITION OF RECURRING PAYEES AND PAYMENTS

(71) Applicant: United Services Automobile Association (USAA), San Antonio, TX (US)

(72) Inventors: Matthew David Nolte, San Antonio, TX (US); Laura Elizabeth Ard, San Antonio, TX (US); Jeffrey Rogers, Helotes, TX (US); Andrea G. Fallucca, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/573,823

(22) Filed: Sep. 17, 2019

Related U.S. Application Data

(63) Continuation of application No. 15/908,572, filed on Feb. 28, 2018, now Pat. No. 10,460,299, which is a continuation of application No. 14/062,073, filed on Oct. 24, 2013, now Pat. No. 9,934,494.

(51) Int. Cl.
| | |
|---|---|
| *G06Q 20/00* | (2012.01) |
| *G06Q 20/10* | (2012.01) |
| *G06Q 20/14* | (2012.01) |
| *G06Q 30/04* | (2012.01) |

(52) U.S. Cl.
CPC .......... *G06Q 20/102* (2013.01); *G06Q 20/00* (2013.01); *G06Q 20/10* (2013.01); *G06Q 20/14* (2013.01); *G06Q 30/04* (2013.01)

(58) Field of Classification Search
None
See application file for complete search history.

(56) References Cited

U.S. PATENT DOCUMENTS

| | | | |
|---|---|---|---|
| 7,643,771 | B2 | 1/2010 | Fukuta |
| 7,693,771 | B1 | 4/2010 | Zimmerman et al. |
| 8,489,497 | B1 | 7/2013 | Novak |
| 9,934,494 | B1 | 4/2018 | Nolte et al. |
| 10,460,299 | B1 | 10/2019 | Nolte et al. |

(Continued)

OTHER PUBLICATIONS

U.S. Appl. No. 14/062,073, filed Oct. 24, 2013, Methods and Systems for Systematic Recognition of Recurring Payees and Payments.

(Continued)

*Primary Examiner* — Joseph W. King
(74) *Attorney, Agent, or Firm* — Perkins Coie LLP

(57) ABSTRACT

Methods and systems for retaining credit card usage through systematic recognition of recurring payments are described. In some embodiments, a method includes receiving user transaction data relating to a payment instrument issued to a user. The user transaction data may include payees and a schedule of payments to the payees. The method may further include identifying recurring payees based on a category of each of the payees. In response to a triggering event requiring an account update of the payment instrument, a report identifying the recurring payees may be generated for the user.

20 Claims, 7 Drawing Sheets

(56) References Cited

U.S. PATENT DOCUMENTS

| | | |
|---|---|---|
| 2004/0122736 A1 | 6/2004 | Strock |
| 2004/0139011 A1* | 7/2004 | Kozee .................... G06Q 30/04 |
| | | 705/40 |
| 2008/0172316 A1 | 7/2008 | Adams |
| 2011/0295743 A1 | 12/2011 | Patterson |
| 2014/0012704 A1 | 1/2014 | Mizhen |
| 2014/0244482 A1 | 8/2014 | Joa |

OTHER PUBLICATIONS

U.S. Appl. No. 15/908,572, filed Feb. 28, 2018, Methods and Systems for Systematic Recognition of Recurring Payees and Payments.

* cited by examiner

FIG. 6

METHODS AND SYSTEMS FOR SYSTEMATIC RECOGNITION OF RECURRING PAYEES AND PAYMENTS

This application is a continuation of U.S. patent Ser. No. 15/908,572, filed on Feb. 28, 2018, entitled "METHODS AND SYSTEMS FOR SYSTEMATIC RECOGNITION OF RECURRING PAYEES AND PAYMENTS," now allowed, which is a continuation of U.S. patent application Ser. No. 14/062,073, filed on Oct. 24, 2013, entitled "METHODS AND SYSTEMS FOR SYSTEMATIC RECOGNITION OF RECURRING PAYEES AND PAYMENTS," issued as U.S. Pat. No. 9,934,494 on Apr. 3, 2018, each of which are hereby incorporated by reference for all purposes in their entireties.

TECHNICAL FIELD

Various embodiments of the present disclosure generally relate to recognizing recurring payees and/or payments. More specifically, various embodiments of the present disclosure relate to methods and systems for systematic recognition of recurring payees and/or payments.

BACKGROUND

In recent years, customers have used credit cards, debit cards, and/or prepaid cards as primary payment instruments in transactions and to pay for many expenses. In some cases, customers set up user accounts at merchant websites that store payment information for convenience of the customer. Customer may also engage a bill payment system using a credit card, debit card, and/or prepaid card to automatically pay bills. Changes to the payment instrument, or information relating to the payment instrument, necessitates updates to these user accounts, bill pay systems, or other payment mechanisms to ensure that the customer does not miss a payment, lose a service, or incur a late fee.

SUMMARY

In some embodiments, methods and systems for systematic recognition of recurring payees and payments are described. One embodiment of the present disclosure includes a method comprising receiving, via a network, user transaction data relating to a payment instrument issued to a user. The user transaction data may include payees and a schedule of payments to the payees. The method may further include identifying, by a processor, recurring payees based on a category of each of the payees. In response to a triggering event, the method may further include generating, for the user, a report identifying the recurring payees. The user transaction data may include historic user transaction data and current user transaction data.

Examples of triggering events may include a breach of sensitive information relating to the payment instrument, fraudulent activity relating to the payment instrument, an expiration of the payment instrument, an address change of the user, and a name change of the user. In some embodiments, the user transaction data includes merchant identifiers, such as, but not limited to, category codes, actual merchant ID, name of merchant, and the like, relating to the payees.

The user transaction data may include a plurality of the schedules of payments over a period of time. Identifying recurring payees may be further based on the plurality of the schedules of payments over the period of time. The recurring payees may receive recurring payments from the user and the method may further include identifying recurring payments based on the plurality of the schedules of payments over the period of time.

In some embodiments, the user transaction data includes one or more account statements, and the payees include at least one of: an account number or a merchant. The method may further include updating, on behalf of the user, account details associated with the payment instrument on a user account associated with at least one of the recurring payees.

In some embodiments, the method further includes issuing a replacement payment instrument to the user; requesting the user to activate the replacement payment instrument; and displaying, in connection with the activation of the replacement payment instrument, the report identifying the recurring payees.

In some embodiments, the user transaction data includes merchant category codes. The method may further include generating a list of merchant category codes associated with recurring payees and categorizing the payees based on the merchant category codes associated with each of the payees. The user transaction data may be received on a periodic basis.

In some embodiments, the method further includes determining, from the indicated recurring payees, the merchant partners. The merchant partners may have a relationship with an issuing organization of the payment instrument. The method may further include automatically updating user accounts of the merchant partners and notifying the user of the updates to the user accounts at the merchant partners. The method may further include receiving user transaction data relating to a plurality of payment instruments; identifying recurring payees for each of the plurality of payment instruments based on the user transaction data relating to each of the plurality of payment instruments; and prompting the user to switch between payment instruments used to pay at least one of the recurring payees.

In other embodiments, a method includes monitoring an account of a user for a triggering event; accessing, via a network, transaction data relating to a payment instrument of the user, wherein the transaction data identifies payees; determining, using a processor, recurring payees of the payees based on a category associated with each of the payees; and indicating, to the user, the recurring payees associated with the payment instrument.

In some embodiments, indicating to the user the recurring payees includes generating a list of the recurring payees; identifying recurring payments associated with the recurring payees; periodically updating the list of recurring payees and the associated recurring payments based on updated user transaction data; and displaying the list of recurring payees and the associated recurring payments on a user device of the user. Determining the recurring payees based on a category of each of the payees may include selecting payees in preselected categories of payees. The preselected categories may include categories of payees identified as including recurring payees. The billing statements may include merchant category codes associated with the payees. The method may further include categorizing the payees based on the merchant category codes associated with the payees.

Determining the recurring payees may include filtering the payees based on a name of the payee and based on a schedule of payments to the payees over a period of time. The method may include determining recurring payments associated with the recurring payees; and automatically updating, on behalf of the user, payment information for the recurring payments on user accounts associated with the recurring payees.

A system may include a transaction data aggregator operable to access transaction data relating to a payment instrument issued to a user. The transaction data may identify payees and merchant category codes associated with each of the payees. The system may further include a recurring payee determination module operable to determine recurring payees based on the merchant category code associated with each of the payees and a recurring payee update module operable to update payee user account information in response to a triggering event requiring an account update of the payment instrument.

While multiple embodiments are disclosed, still other embodiments will become apparent to those skilled in the art from the following detailed description, which shows and describes illustrative embodiments. As will be realized, embodiments of the present disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which:

FIG. 6 illustrates an example of a user interface that may be displayed on a user device in accordance with various embodiments of the disclosure.

Figure 1:
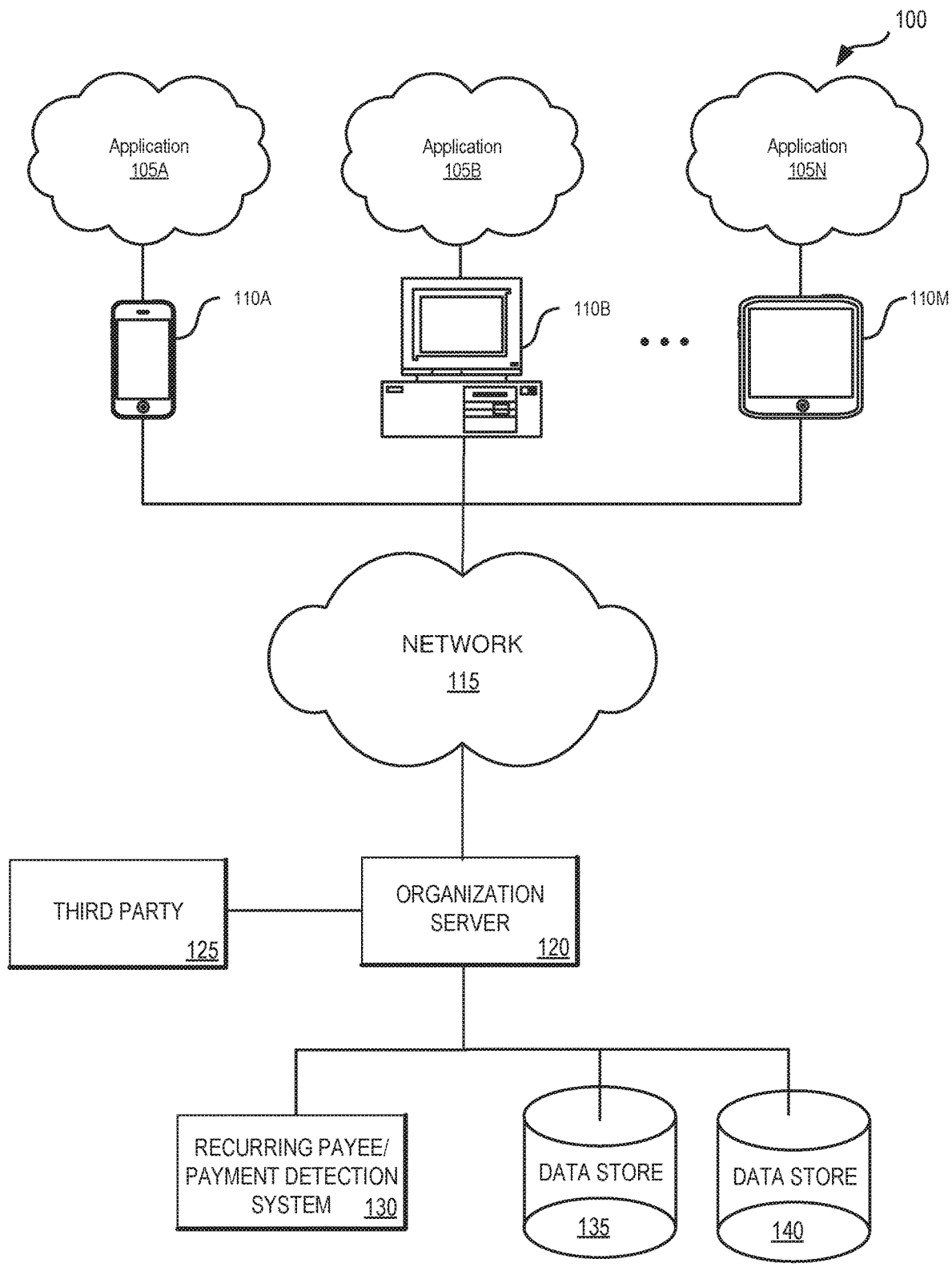
FIG. 1 illustrates an example of an operating environment in which recurring payees and/or payments may be systematically recognized in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to recognizing recurring payees and/or payments. More specifically, various embodiments of the present disclosure relate to methods and systems for systematic recognition of recurring payees and/or payments.

Many users pay recurring bills (e.g., telephone bills) to payees with payment instruments such as credit cards, debit cards, prepaid cards, gift cards, and others. For convenience, many users utilize an on-line bill pay system that automatically charges a payment instrument for recurring bills of these payees. In some circumstances, customers set up user accounts at merchant websites that store payment information for a quick check-out process. Recurring payees may be those payees with recurring payments and may also include payees that store user account information, including payment information, so that the user can make multiple purchases without having to input a payment instrument.

Events may occur requiring an update of the payment instrument. For example, the payment instrument may expire, the user's name may change, a mass fraud may cause a threat of fraudulent activity, and the like. The user may be provided a replacement payment instrument quickly, requiring the user to update account information, including payment information, at many merchants' or other payees' websites after the replacement card is issued. If the user fails to do this, the user may be faced with late payment charges, a shut-off of services, a black mark on their credit, or an embarrassing situation. Moreover, the user may decide to switch to a different payment instrument, losing business for the issuing organization.

This disclosure is directed to an approach for retaining credit card usage by systematic recognition of recurring payees associated with recurring payments. In some embodiments, user transaction data is aggregated. The user transaction data may be analyzed and the payees associated with recurring payments such as telephone companies, internet providers, trash removal services, gyms, and water providers are identified. These payees may be identified using one or more identifiers such as a merchant category code, the payee's name, the amount and frequency of the payments, and other methods. Merchant category code is a four-digit number assigned to a business by a credit card company when the business accesses one of the cards as a form of payment. The merchant category code is used to classify the business by type of goods or services it provides.

The user transaction information may be updated periodically or on a transaction-by-transaction basis. Upon receiving a notice of a triggering event that requires an account update, the user may be notified of the recurring payees and/or payments so that the user may contact the recurring payees and update the user's account information. Non-limiting examples of triggering events include a mass fraud, address change, name change, user logon, opening of an account, opening of a new credit card or line of credit, reactivation of a card, and information received by the issuing or bill paying organization. In some embodiments, the triggering event occurs when two or more such events occur and are detected. In some embodiments, the issuing organization automatically notifies or updates the user account information at the payee accounts on behalf of the user. In some embodiments, the user is issued a replacement card. The user may be provided a report of the recurring payees when the user activates the user's replacement card.

In the following description, for the purposes of explanation, numerous specific details are set forth in order to provide a thorough understanding of embodiments of the present disclosure. It will be apparent on reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of an operating environment 100 in which some embodiments of the present disclosure may be used. As illustrated in FIG. 1, operating environment 100 may include applications 105A-105N running on one or more user devices 110A-110M (such as a mobile device, a mobile phone, a tablet computer, a mobile media device, a mobile gaming device, a vehicle-based computer, a dedicated terminal, a public terminal, a kiosk, etc.). In some embodiments, applications 105A-105N may be stored on the user device or may be stored remotely. These user devices can include mechanisms for receiving and sending traffic by connecting through network 115 to organization server 120, third party 125, recurring payee/payment detection system 130, and data stores 135 and 140. For example, user devices 110A-110M may run one or more applications or clients 105A-105N that allow a user to interact with organization server 120. Such applications may provide access to information such as information stored in data stores 135 and 140.

In addition, user devices 110A-110M can include network communication components that enable the user devices 110A-110M to communicate with network 115 or other electronic devices by transmitting and receiving wireless signals using a licensed, semi-licensed or unlicensed spectrum over network 115. In some cases, network 115 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 115 can also include third-party communications networks, such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, or other communications networks.

Organization server 120 may be a web server (e.g., HTTP server) that is used to serve static or dynamic content such as websites and may be communicably connected to one or more application servers for dynamic content processing. Organization server 120 may be communicable coupled with third party 125, and may access or receive transaction data from third party 125. The data stores 135 and 140 can be used to manage storage and access to data such as transaction data. Organization server 120 may be associated with a membership organization, and the users may be members or potential members of the membership organization. The organization may be a financial institution, or any kind of entity providing any type of service.

Third party 125 may include historic and current transaction data for users relating to one or more payment instruments. Transaction data may include billing statements such as credit card billing statements, payees, payment amounts, merchant category codes, dates of charges, dates of payment, identities of payors, and the like. Third party 125 may aggregate such user transaction data and send or provide access to this data to organization server 120. In some embodiments third party 125 may provide access or send the data directly to recurring payee/payment detection system 130.

Data stores 135 and 140 may be a data repository of a set of integrated objects that are modeled using classes defined in database schemas. Data store may further include flat files that can store data. Data stores 135 and 140 may store information about users, including historic and current transaction information, billing statements, employment information, account balances, credit ratings, length of time the user has possessed a payment instrument, home ownership information, annual salary, length of membership, and/or other information. Organization server 120 and/or other servers may collect and/or access data from the data stores 135 and 140.

Recurring payee/payment detection system 130 may determine recurring payees/payments relating to one or more payment instruments using various techniques. For example, the merchants may be categorized by a merchant category code. Or, in some embodiments, recurring payees and/or payments may be determined by a review of a schedule of payments over a period of time. In some embodiments, the payee name or category of the payee indicates recurring payments. For example, if the user's billing statement indicates a charge to AT&T®, then it may be assumed that the user has a recurring phone bill (recurring payment) to AT&T® (recurring payee). Recurring payee/payment detection system 130 may have access to a computer system associated with the organization or authorized third parties and may access the data stores 135 and 140 for transaction data, account information, user information, security information, and other stored information. In addition, third parties may provide information relating to users such as an address of the user, a credit score of the user, or any other information.

In order to identify recurring transactions, various embodiments of the payee/payment detection system 130, may aggregate data from different accounts and analyze the data to identify common payment patterns (e.g., frequency, transaction amounts, etc.). The system can use this information to determine if multiple accounts regularly pay certain payees on a regular basis. As a result, the system can identify a possible recurring payment even if only one transaction shows up on an individual's account. For example, suppose AT&T® charges for the amount of $160.34 regularly appear in the aggregated data as recurring payments for many customers. Then, if an individual customer has recently switched service AT&T® and only one payment in the amount of $160.34 occurs on the transaction data, the system can recognize this as a possible recurring payment.

In other embodiments, the system may detect that a recurring payee or payment has dropped off recently gathered transaction data. In some embodiments, a the potential recurring payee or payment drop-off may be detected, followed by a confirmation period to ensure that the user did not accidentally miss a payment or have a different reason for a one or two time lapse in payments.

In some embodiments, after a possible recurring payment is detected as being added or removed, the user may be contacted and asked to verify that the possible recurring payment is indeed a recurring payment or that the recurring payment has been removed. The user could be contacted using a push notification, a text message, email, phone call, and the like.

Figure 2:
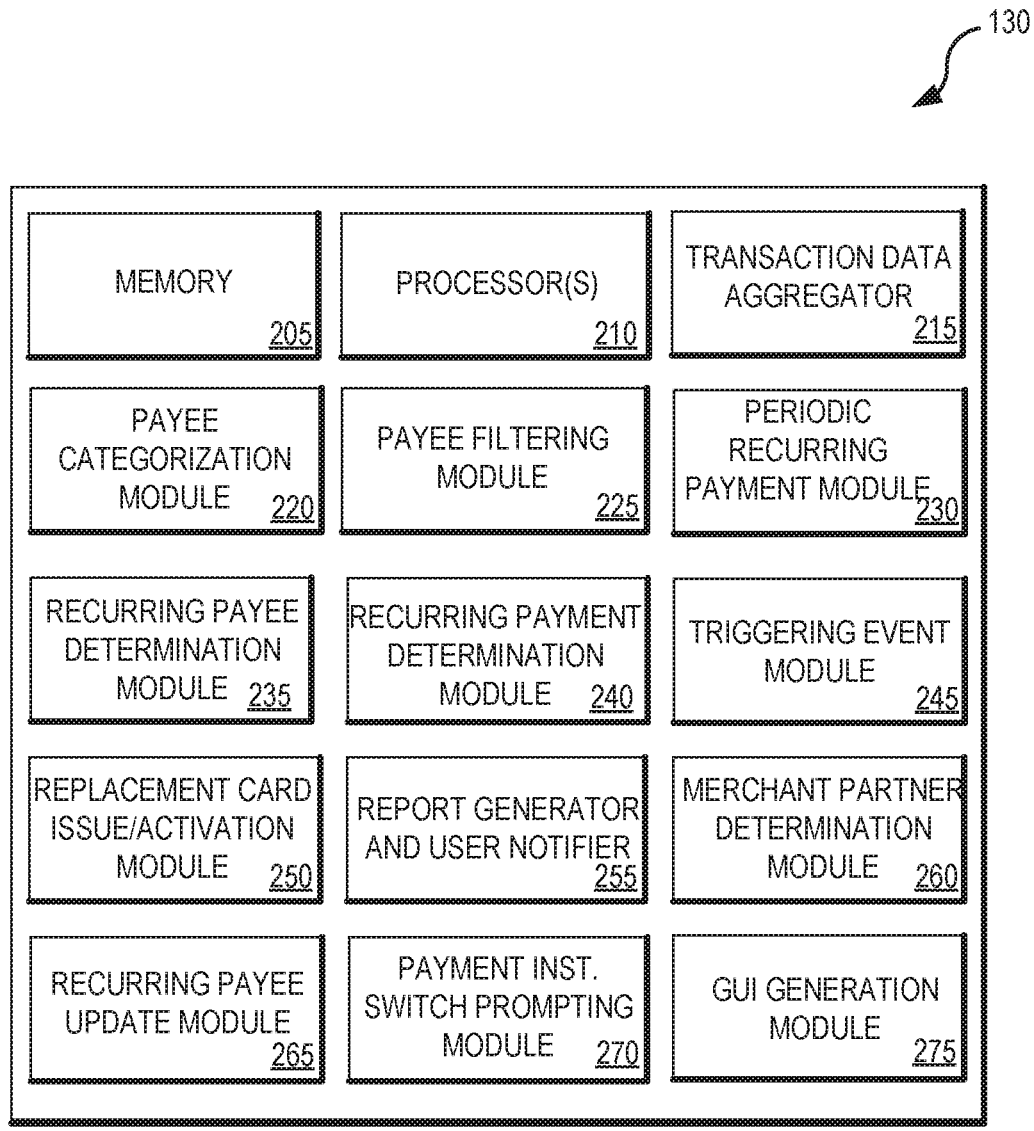
FIG. 2 is a block diagram illustrating components that can be included in a recurring payee and/or payment detection system in accordance with various embodiments of the disclosure.

FIG. 2 is a block diagram illustrating components that can be included in a system such as system 100. For example, the components discussed in relationship to FIG. 2 may be used in connection with an organization system that determines recurring payees and/or payments.

According to the embodiments shown in FIG. 2, recurring payee/payment detection system 130 may include memory 205, processor(s) 210, transaction data aggregator 215, payee categorization module 220, payee filtering module 225, periodic recurring payment module 230, recurring payee determination module 235, recurring payment determination module 240, triggering event module 245, replacement card issue/activation module 250, report generator and user notifier 255, merchant partner determination module 260, recurring payee update module 265, payment instrument switch prompting module 270, and Graphic User Interface (GUI) generation module 275. Other embodiments of the present disclosure may include some, all, or none of these modules and components along with other modules, applications, and/or components. The modules and components illustrated in FIG. 2 may be hardware, firmware, software, or a combination. Still yet, some embodiments may incorporate two or more of these modules into a single module and/or associate a portion of the functionality of one or more of these modules with a different module.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of transaction data aggregator 215, payee categorization module 220, payee filtering module 225, periodic recurring payment module 230, recurring payee determination module 235, recurring payment determination module 240, triggering event module 245, replacement card issue/activation module 250, report generator and user notifier 255, merchant partner determination module 260, recurring payee update module 265, payment instrument switch prompting module 270, and GUI generation module 275.

Transaction data aggregator 215 can aggregate transaction data from various sources. Transaction data may include billing statements such as credit card billing statements, a schedule of payments due to the payees, payees, payment amounts, merchant category codes, dates of charges, dates of payment, identity of payor, and the like. Transaction data may be aggregated for one payment instrument issued to a user or for multiple payment instruments issued to a user.

Transaction data aggregator 215 can request, receive, and/or access transaction data from sources internal to the organization or external to the organization, such as third party 125. In some embodiments, transaction data may be collected from bill payment service organizations. Transaction data may include historic and current transaction information and may be updated on a schedule (e.g., periodically), such as monthly. For example, the transaction data may be a credit card billing statement which may be received from a third party or generated internally to the organization on a monthly basis. In some embodiments, the past 120 days of transaction data is aggregated. Transaction data may include a collection of data sets with may users' transaction data. Such data may be analyzed to detect trends or patterns used to detect recurring payments or recurring payees. Transaction data may be pushed to payee categorization module 220, payee filtering module 225, periodic recurring payment module 230, recurring payee determination module 235, and recurring payment determination module 240 with each transaction.

Payee categorization module 220 may receive transaction data from transaction data aggregator 215 and categorize payees to determine recurring payees and/or recurring payments. As discussed, recurring payees may be those payees with recurring payments and/or payee that store user account information, including payment information, so that the user can make multiple purchases without having to input payment instrument. This information must be updated if the user's payment instrument was replaced or updated. Payee categorization module 220 may categorize the payees based on a likelihood that the associated merchant category code includes payees with recurring payments or with account information that needs to be updated. In some embodiments, payee categorization module 220 may categorize the payees by merchant category codes. The merchant category codes may be included in the transaction data. Payee categorization module 220 may generate a list of merchant category codes associated with recurring payees.

In some embodiments, the transaction data does not include merchant category codes. However, payee categorization module 220 may categorize the payees based on payee names, payment amount, or other criteria. The categorized payees may be communicated to payee filtering module 225 for further filtering, to recurring payee determination module 235, and/or to recurring payment determination module 240.

Payee filtering module 225 may receive categorized payees from payee categorization module 220 and filter the payees based on a likelihood that the payees include account information that must be updated should a user's account details change. Payee filtering module 225 can filter the payees further by determining which payees are the same and de-duplicating the duplicated payees. For example, if several historic and/or current billing statements are included in the transaction data, some payees may appear several times for different or the same purchases or bills. These payees may be described/labeled in various ways (e.g., different spellings or abbreviations). In some embodiments, payee filtering module 225 filters the payees simply by payee name based on a preselected list of merchants.

Periodic recurring payment module 230 can receive user transaction data and determine recurring payments based on a schedule of payments due or payments made to payees over a period of time. For example, periodic recurring payment module 230 may analyze historic and current user transaction data, looking for patterns of payments made or bills due at a regular interval. In some embodiments, payees may be account numbers or persons instead of merchants. In such circumstances, recurring payees of this type may be identified using periodic recurring payment module 230.

Recurring payee determination module 235 can determine the recurring payees. Recurring payee determination module 235 may use information received from the payee categorization module 220, payee filtering module 225, and periodic recurring payment module 230. For example, recurring payee determination module 235 may review the filtered list of de-duplicated payees to determine the user's recurring payees by selecting payees in preselected categories identified as including recurring payees. The recurring payee determination module 235 may further modify the list of recurring payees based on the recurring payees or payments determined by the periodic recurring payment module 230.

Recurring payee determination module 235 may also detect recurring payees that are no longer recurring by comparing recent transaction data with historic transaction data. In some embodiments, once recurring payee determination module 235 detects that a recurring payee may no longer be a recurring payee, recurring payee determination module 235 may wait for additional transaction data and confirm that the recurring payee is no longer a recurring payee. In some embodiments, the user may be contacted and asked to confirm this.

Recurring payment determination module 240 can determine the recurring payments associated with the recurring payees. In some cases, the user may have a monthly bill due to a payee (e.g., a phone bill), but may have also purchased an item from the payee (e.g., a phone cover for a phone). Thus, recurring payment determination module 240 may determine the specific recurring payment associated with the recurring payee.

Recurring payment determination module 240 may also detect when recurring payments are no longer recurring based recent transaction data. In some embodiments, once recurring payment determination module 240 detects that a recurring payment may no longer be recurring payments, recurring payment determination module 240 may wait for additional transaction data for confirmation. In some embodiments, the user may be contacted and asked to confirm that the recurring payment is no longer a recurring payment.

Both recurring payee determination module 235 and recurring payment determination module 240 may use Big Data (large and complex data sets) to establish patterns or trends for recurring payees/payments. Using pattern setting algorithms, the user's recurring payees and payments may be detected sooner, requiring less of the user's specific transaction data. For example, if most user's phone bill in the geographic-specific area around $100 per month, and one month of user transaction data shows a bill to a phone company for that amount, it may be assumed that the phone company is a recurring payee and that the phone bill is a recurring payment. In another example, if the user transaction data shows that the user is charged several hundred dollars to an insurance company one month after not having ever paid the insurance company, recurring payee determination module 235 and recurring payment determination module 240 may determine that this customer likely pays their insurance bill every six months, and that this is likely a recurring payee/payment. The user may be notified and asked to verify this information.

Triggering event module 245 detects an event that requires an account update of a payment instrument. For example, the triggering event may be a breach of sensitive information, a report of fraudulent activity, an address change, CVV update, or expiration of the payment instrument. Triggering event module 245 may detect the event based on a phone call from the user reporting suspicious activity or a mass recall of credit cards due to a security breach reported by the issuing organization. The user's card may be expiring or the user may have moved. Based on any of these events, the user's account at the issuing organization is updated, and the user's account with the recurring payees may need to be updated to pay using the payment instrument or replacement payment instrument. Replacement cards may need to be issued based on these events. Triggering event module 245 may provide information regarding the triggering event to the replacement card issue/activation module 250.

Figure 6:
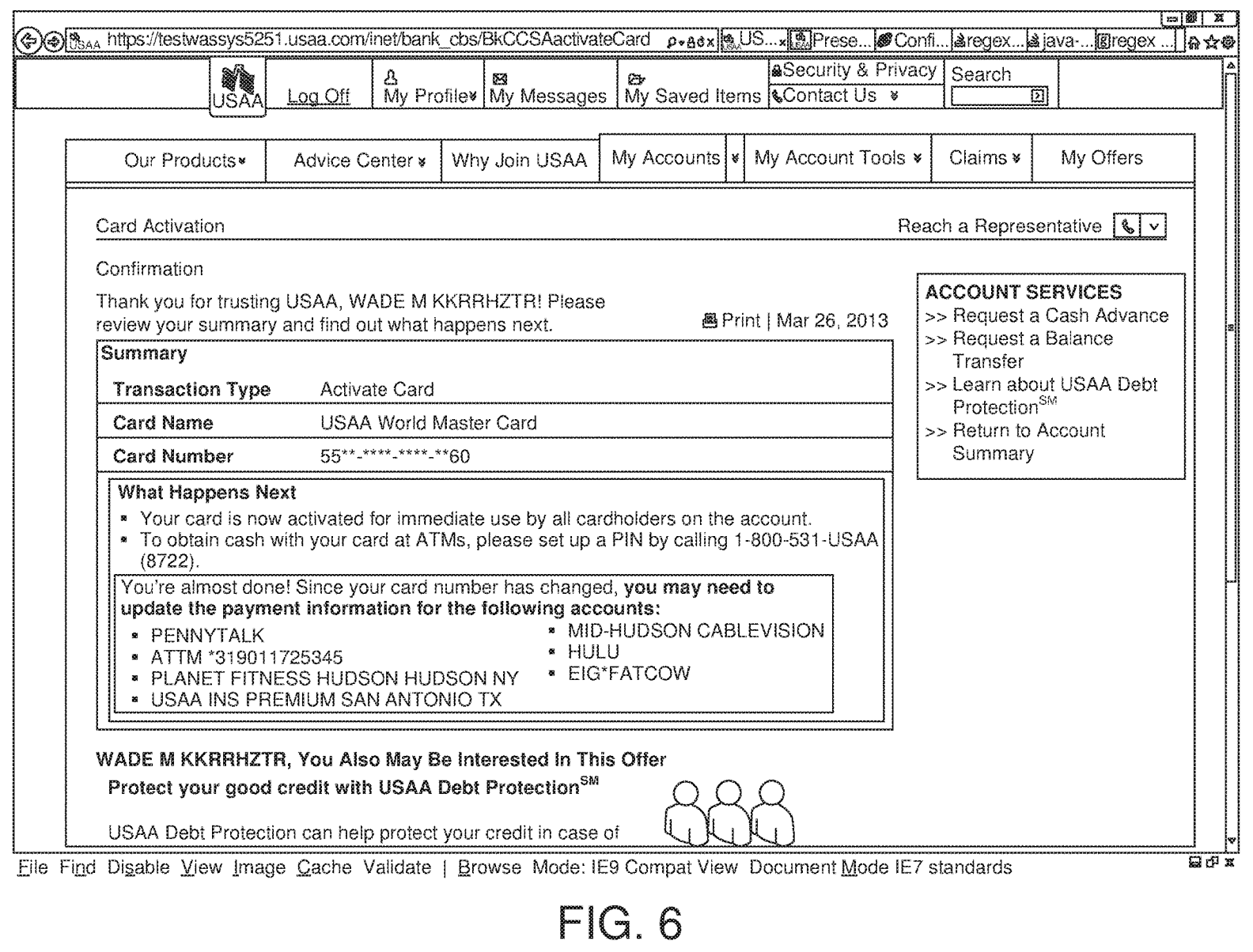

Replacement card issue/activation module 250 can receive account updates from the triggering event module 245, determine whether a replacement card needs to be issued, issue a replacement card if necessary, and activate the replacement card. The user may be asked to take an action to activate the replacement card, such as dial a number provided on the replacement card, login to a website or mobile application, respond to a text message or push notification, etc., and provide credentials to assure the issuing organization that the correct user received the replacement card. When the user activates the new card, the user may be presented with a report showing the recurring payees or payments associated with the payment instrument that need to be updated. An example user interface of an activation screen depicting a report is shown in FIG. 6. In some embodiments, the user is asked to verify or provide a list of recurring payees at times other than activation. For example, the user may be asked to confirm the list upon login.

Report generator and user notifier 255 generates a report of the recurring payees and/or payments and notifies the user of these payees. The user may be notified upon activation of the replacement card, as depicted in FIG. 6. In other embodiments, the user is texted, emailed, called, or notified in other ways of the recurring payees after any triggering event. For example, if the user updates their address, the report generator and user notifier 255 may notify the user of the recurring payees and/or payments, making the transition to the new address smoother for the user while retaining the user's business. In some embodiments, as described below, the issuing organization may notify recurring payees, particularly if these recurring payees are merchant partners and/or if the user has provided the credentials and permission, of the updated account information on behalf of the user. Report generator and user notifier 255 may notify the user of the recurring payees that have already received or will receive updated information from the issuing organization automatically and which of the recurring payees the user should contact, if any.

Merchant partner determination module 260 may determine which payees, if any, are merchant partners. Merchant partners may include partners with agreements between the card issuer and the merchant such that user's information may be updated without an action from the user. Merchant partners may be affiliates with the issuing organization.

Recurring payee update module 265 can automatically update the user's account information (e.g., payment information) for the recurring payments on user accounts associated with the recurring payee. The user's credentials and permission may be required to make these updates. Screen scraping techniques and other techniques known in the art may be used. In some embodiments, recurring payee update module 265 receives information regarding merchant partners from merchant partner determination module 260, uses this information, and automatically updates the information at the merchant partners.

Payment instrument switch prompting module 270 can receive transaction data regarding several payment instruments from transaction data aggregator 215, and can analyze the transaction data to identify recurring payees/payments from each of the payment instruments based on the user transaction data. Using this information, payment instrument switch prompting module 270 may prompt the user to switch payments between payment instruments used to pay at least one of the recurring payees. This may be based on an analysis of rewards points or other incentives. Payment instruments may include credit cards, debit card, prepaid cards, gift cards, gas cards, or other payment instruments. In some embodiments, payment instrument switch prompting module 270 may be used as an advertising mechanism. In some embodiments, when a user receives a new card or when a card is deactivated, payment instrument switch prompting module 270 may prompt the user to activate a new card.

GUI generation module 275 can generate one or more GUI screens that allow for interaction with a user. In at least one embodiment, GUI generation module 275 generates a graphical user interface receiving and/or conveying information to the user, and allowing a user to view reports identifying recurring payees and/or payments, account status, or other information.

Figure 3:
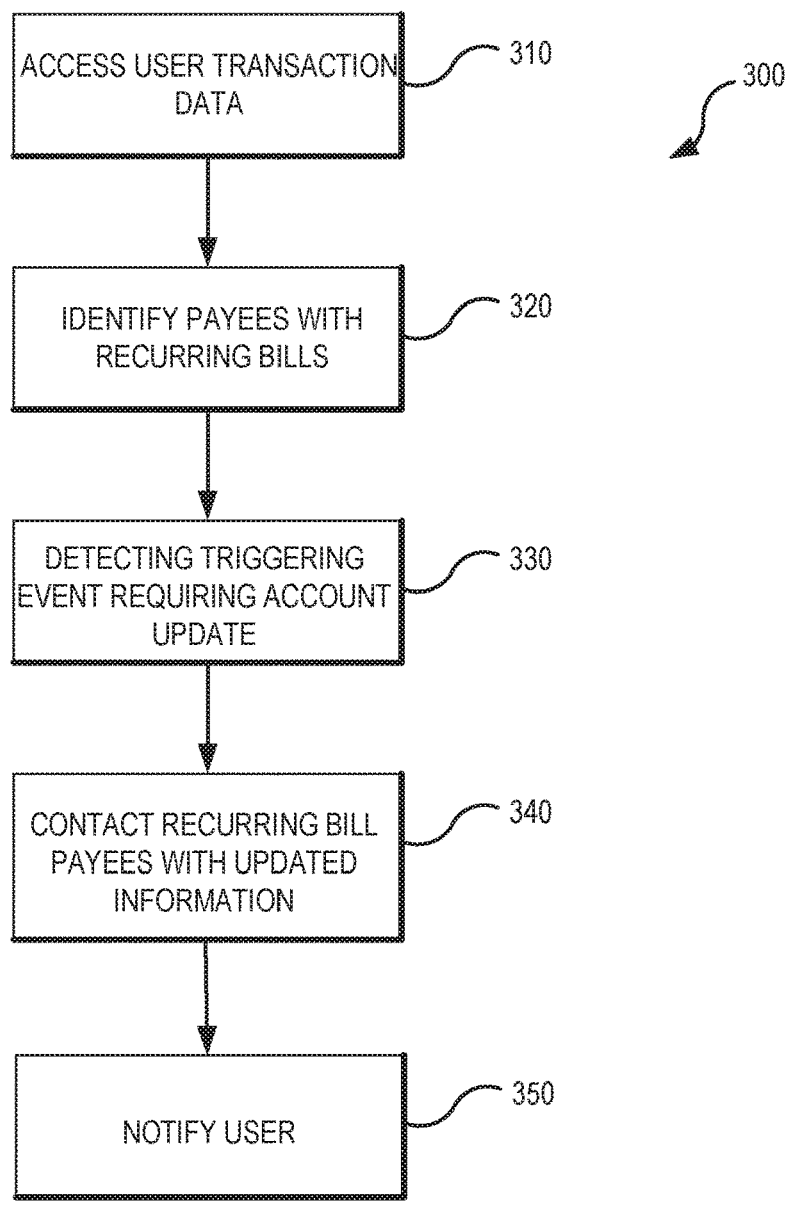
FIG. 3 is a flowchart illustrating a set of operations for automatically updating recurring payee user accounts and/or payment information.

FIG. 3 is a flowchart illustrating a set of operations 300 for automatically updating recurring payee user accounts and/or payment information. In some embodiments, fewer than all of the operations are performed, whereas in other embodiments additional operations are performed, such as operations performed in the sets of operations described in FIGS. 4-5. Moreover, in some embodiments, the operations may be performed in different orders. The operations can be performed by various components in FIG. 2 such as memory 205, processor(s) 210, transaction data aggregator 215, payee categorization module 220, recurring payee determination module 235, recurring payment determination module 240, triggering event module 245, report generator and user notifier 255, and GUI generation module 275.

Accessing operation 310 accesses user transaction data relating to a payment instrument issued to the user is accessed. The user transaction data may be accessed from sources internal to the issuing organization or from third parties who aggregate such information. Identifying operation 320 identifies payees with recurring bills using the user transaction data accessed from accessing operation 310. Recurring payees may be identified in a number of different ways. For example, the recurring payees may be identified by the payee's name, a merchant category code associated with the payee, and/or a schedule of payments due or paid using the payment instrument to the payee.

In some embodiments, recurring payees may be identified by the user. The user may initiate the listing or may be prompted by the system to identify recurring payments once they have been identified. For example, if a new phone bill is detected by the system as a potential recurring payment, the system may push an confirmation request to the user. The request may also provide a list of other payments previously confirmed which the user can indicate have been removed. In addition, the confirmation request may prompt the user to identify or list other recurring payments that the user has setup.

Detecting triggering event operation 330 detects a triggering event requiring an account update of the account associated with the payment instrument. For example, a data breach of the issuing company may require a number of payment instruments to be replaced. In such circumstances, recurring payees will need updated payment information prior to receiving another charge. Other triggering events include a change of address, an expiration of a payment instrument, a change in name, a compromised CVV, an address change, or fraudulent or suspected fraudulent activity relating to the payment instrument.

Contacting operation 340 receives information regarding the triggering event and contacts recurring bill payees with the user's updated account information. Merchant partners or other payees that the user has provided credentials and permission to contact may be among those recurring payees who are contacted.

Notifying operation 350 notifies the user that a replacement payment instrument is necessary due to the triggering event, notifies the user of the recurring payees that have been or will be automatically contacted, and notifies the user of those recurring payees that may need to be contacted to update the user's account information. The user may be presented a list or other indication of these categories of recurring payees upon activation of the replacement payment instrument.

Figure 4:
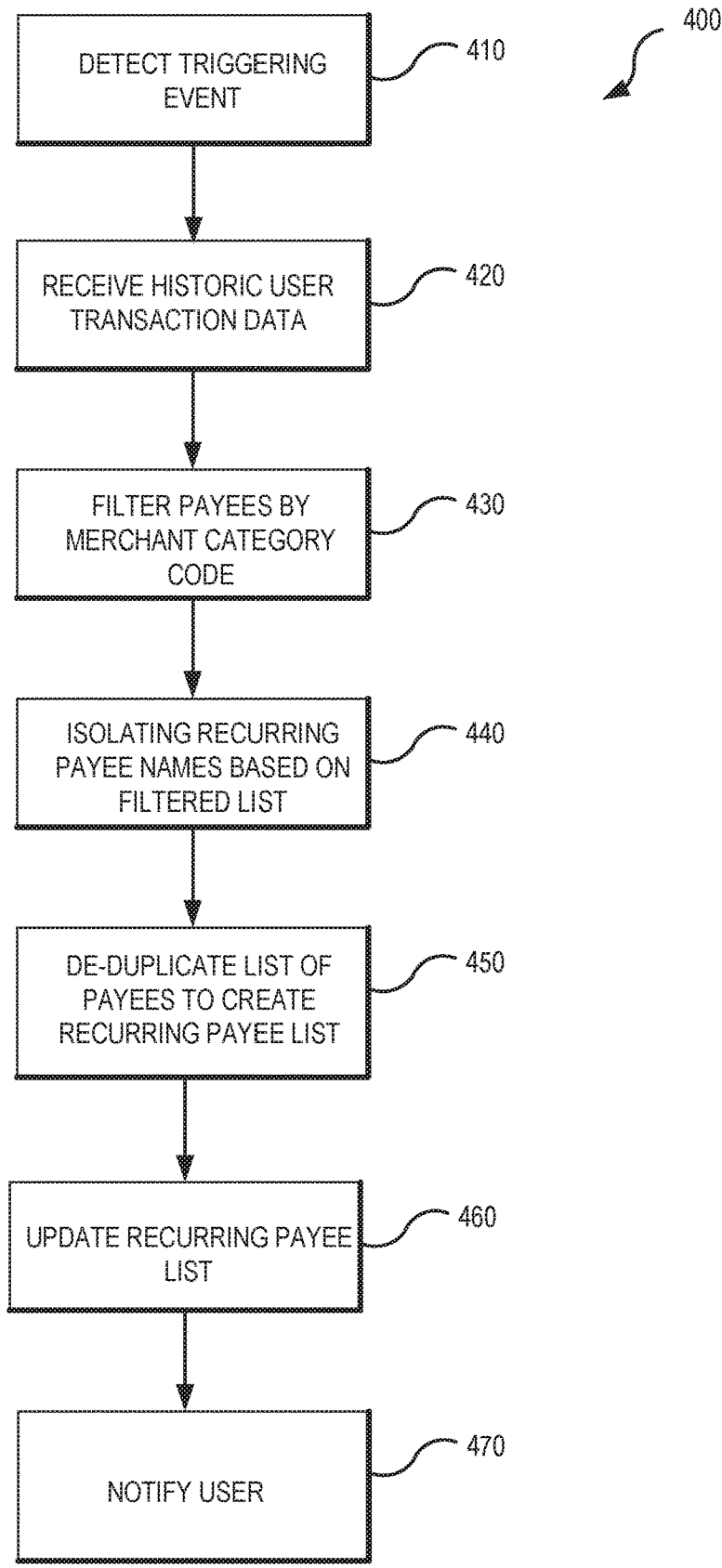
FIG. 4 is a flowchart illustrating a set of operations that can be included in a recurring payee and/or payment detection system in accordance with various embodiments of the disclosure.

FIG. 4 is a flowchart illustrating a set of operations 400 that can be included in a recurring payee and/or recurring payment detection system in accordance with various embodiments of the disclosure. In some embodiments, fewer than all of the operations are performed, whereas in other embodiments additional operations are performed, such as operations performed in the sets of operations described in FIGS. 3 and 5. Moreover, in some embodiments, the operations may be performed in different orders. The operations can be performed by various components in FIG. 2 such as memory 205, processor(s) 210, transaction data aggregator 215, payee categorization module 220, payee filtering module 225, periodic recurring payment module 230, recurring payee determination module 235, recurring payment determination module 240, triggering event module 245, replacement card issue/activation module 250, report generator and user notifier 255, merchant partner determination module 260, and recurring payee update module 265.

Detecting triggering event operation 410 receives information relating to a triggering event requiring account information relating to the payment instrument to be updated. As discussed above, triggering events may include an address change, fraudulent activity, expiration of the payment instrument, user logon, download of mobile application, card activation, the passing of a certain period of time, or other events. Receiving operation 420 receives user transaction data relating to at least one payment instrument of the user. The user transaction data may be received in response to detecting the triggering event, or it may be received and/or reviewed periodically. The user transaction data may include payees tagged with merchant category codes. Filtering operation 430 filters payees by merchant category code. For example, payees tagged with merchant category codes identified as including recurring payees (phone companies, internet providers, trash removal services, insurance providers, etc.) may be separated from other payees. This may provide an initial list of recurring payees based on merchant category code. Isolating payee names operation 440 may isolate the specific recurring payee names from the merchant category code and other user transaction information from the filtered list in filtering operation 430, resulting in a simple list of recurring payee names. Isolating recurring payee names operation 440 may also normalize any payee names that are misspelled, abbreviated, or otherwise are identified other than in a standard way.

From the isolated list of recurring payees, de-duplicating operation 450 may de-duplicate the list of recurring payees based on the filtered list form filtering operation 430. For example, if multiple payments were charged to a payee, the payee name may occur several times on the user transaction data. De-duplicating operation 450 may de-duplicate this list. In some embodiments, de-duplicating operation 450 may identify which payments made to the recurring payees are truly recurring and identify this information as well.

Over time, additional user transaction data may be received. For example, the user data may be received periodically or on a transaction-by-transaction basis. Updating recurring payee list operation 460 may update the recurring payee list using the techniques discussed above. The recurring payee list and recurring payments list may be updated each time the user logins to the organization website or on a periodic basis.

Notifying operation 470 notifies the user of the updated account information and the need to update user account information at recurring payee user accounts.

Figure 5:
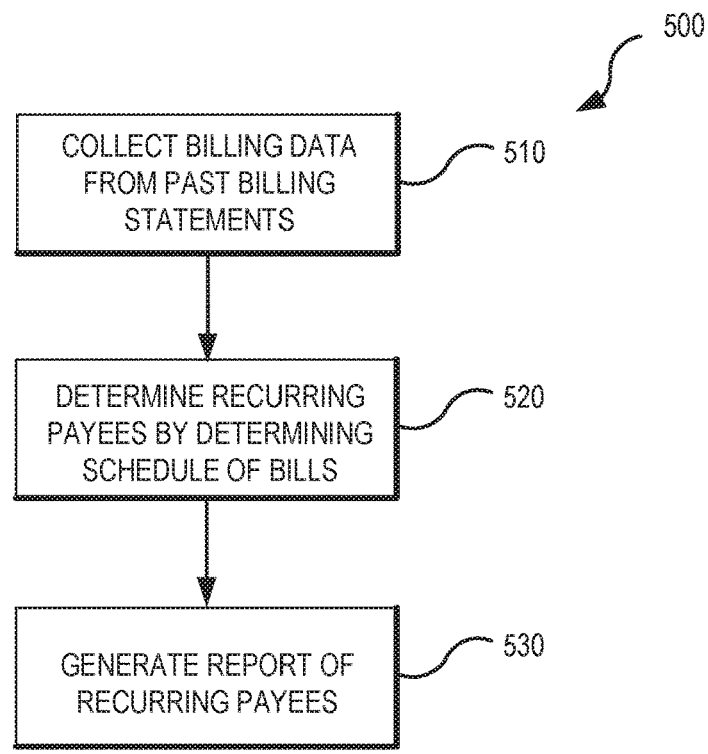
FIG. 5 is a flowchart illustrating a set of operations for generating a report of recurring payees and/or recurring payments associated with a payment instrument.

FIG. 5 is a flowchart illustrating a set of operations 500 for generating a report of recurring payees associated with a payment instrument. In some embodiments, fewer than all of the operations are performed, whereas in other embodiments additional operations are performed, such as operations performed in the sets of operations described in FIGS. 3-4. Moreover, in some embodiments, the operations may be performed in different orders. The operations can be performed by various components in FIG. 2 such as memory 205, processor(s) 210, transaction data aggregator 215, periodic recurring payment module 230, recurring payment determination module 240, and report generator and user notifier 255.

Collecting operation 510 collects billing data from past billing statements relating to a payment instrument. Determining recurring payees operation 520 determines recurring payees by determining the schedule of bills to be paid to a payee. For example, if a bill with the same amount (or similar amount) is billed the same date every month to a payee, determining recurring payees operation 520 may identify that payee as a recurring payee.

Report generation operation 530 generates a recurring payee report. This report may be provided to a user upon activation of a replacement card, logging into a user account, upon notice of a triggering event requiring an account update, or when requested by the user.

FIG. 6 depicts an example of a user interfaces that may be used in connection with systems and methods for systematic recognition of recurring payee/payments. The user interface depicted in FIG. 6 may be presented to a user when the user is activating a replacement card. The user interface indicates the recurring payees that the user may need to contact with updated information so that the user avoids late fees, a removal of services, or other issues.

Computer System Overview

Figure 7:
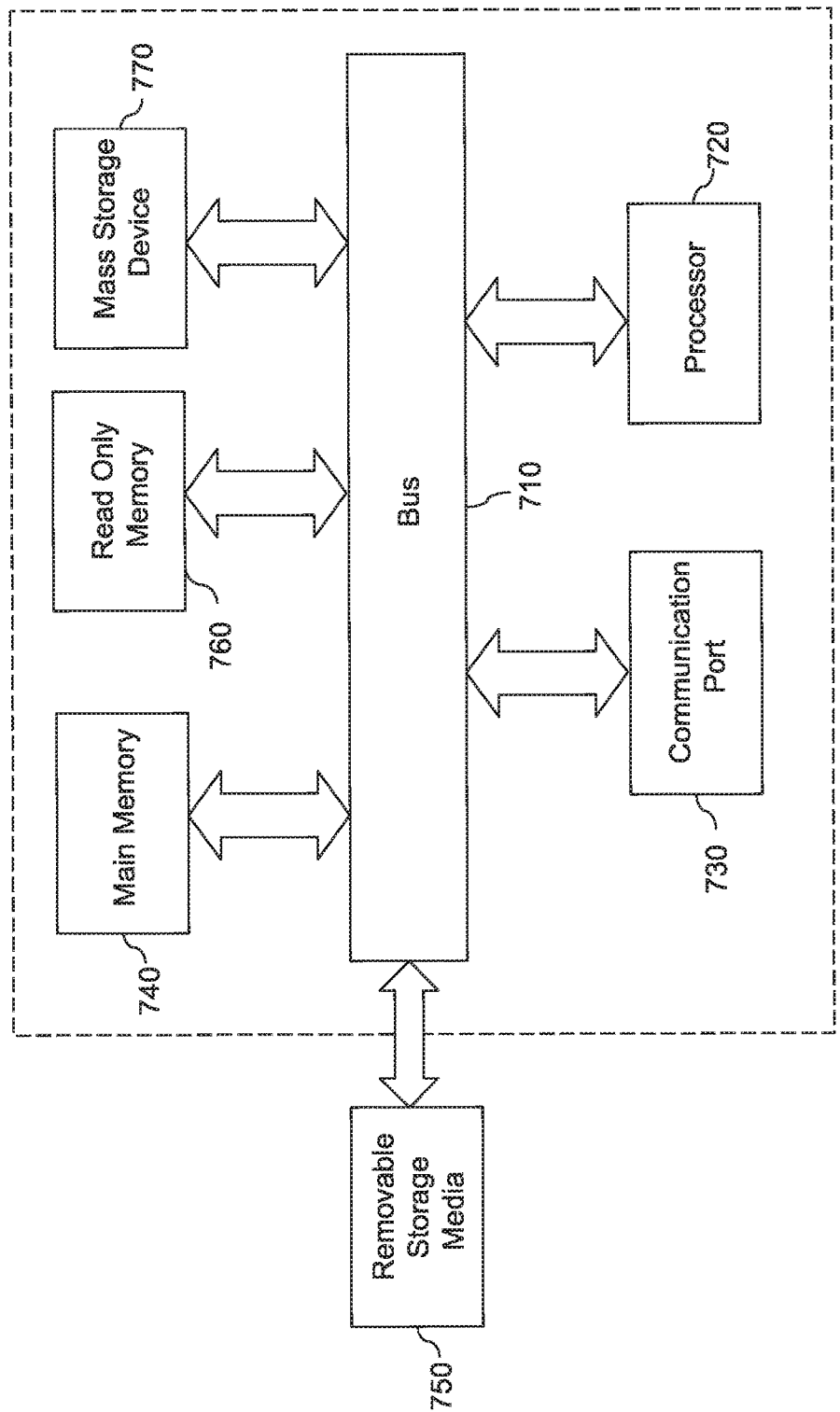
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system includes a bus 710, at least one processor 720, at least one communication port 730, a main memory 740, a removable storage media 750, a read only memory 760, and a mass storage 770.

Processor(s) 720 can be any known processor, such as, but not limited to, an Intel® Itanium® or Itanium 2® processor(s), or AMD® Opteron® or Athlon MP® processor(s), or Motorola® lines of processors. Communication port(s) 730 can be any of an RS-232 port for use with a modem-based dialup connection, a 10/100 Ethernet port, or a Gigabit port using copper or fiber. Communication port(s) 730 may be chosen depending on a network such a Local Area Network (LAN), Wide Area Network (WAN), or any network to which the computer system 700 connects.

Main memory 740 can be Random Access Memory (RAM), or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID, such as the Adaptec family of RAID drives, or any other mass storage devices may be used.

Bus 710 communicatively couples processor(s) 720 with the other memory, storage, and communication blocks. Bus 710 can be a PCI/PCI-X or SCSI based system bus depending on the storage devices used.

Removable storage media 750 can be any kind of external hard-drives, floppy drives, IOMEGA® Zip Drives, Compact Disc—Read Only Memory (CD-ROM), Compact Disc—Re-Writable (CD-RW), Digital Video Disc—Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present disclosure may be provided as a computer program product which may include a machine-readable medium having stored thereon instructions which may be used to program a computer (or other electronic devices) to perform a process. The machine-readable medium may include, but is not limited to, floppy diskettes, optical discs, compact disc read-only memories (CD-ROMs), and magneto-optical discs, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link (e.g., a modem or network connection).

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for systematic recognition of recurring payees and payments. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A non-transitory computer-readable storage medium comprising a set of instructions that, when executed by one or more processors, cause a machine to:
   categorize payees in a set of user transaction data of a user as a recurring payee or a non-recurring payee based at least in part on a schedule of payments to the payees;
   generate a list of the categorized recurring payees;
   identify recurring payments associated with the categorized recurring payees; and
   in response to the user logging onto an organizational website, update the list of the categorized recurring payees and the associated recurring payments.

2. The non-transitory computer-readable storage medium of claim 1, wherein the set of instructions, when executed by the one or more processors, further cause the machine to:
   in response to a triggering event:
      generate, for the user, a report identifying each of the categorized recurring payees; and
      automatically change payment information relating to the user for each of the categorized recurring payees, wherein the triggering event is a type of triggering event requiring an account update.

3. The non-transitory computer-readable storage medium of claim 2, wherein the set of instructions, when executed by the one or more processors, further cause the machine to:
   issue a replacement payment instrument to the user;
   request the user to activate the replacement payment instrument; and
   display, at a user interface, in connection with the activation of the replacement payment instrument, the report identifying the recurring payees.

4. The non-transitory computer-readable storage medium of claim 2, wherein the triggering event is one of: a breach of sensitive information relating to a payment instrument, fraudulent activity relating to the payment instrument, an expiration of the payment instrument, an address change of the user, a name change of the user, an account statement generation, an opening of an account, an opening of a new credit card or line of credit, a reactivation of a card, or information received by an issuing or bill paying organization.

5. The non-transitory computer-readable storage medium of claim 1, wherein the set of instructions, when executed by the one or more processors, further cause the machine to:
   receive updated user transaction data;
   detect that one of the categorized recurring payees is no longer a recurring payee based on the updated user transaction data; and
   after a confirmation period, contact the user to confirm that the one of the categorized recurring payees is no longer the recurring payee.

6. The non-transitory computer-readable storage medium of claim 1, wherein the set of user transaction data includes a plurality of the schedule of payments over a period of time, wherein categorizing the payees as the recurring payee or the non-recurring payee is further based on the plurality of the schedule of payments over the period of time.

7. The non-transitory computer-readable storage medium of claim 6, wherein the recurring payments are identified based on the plurality of the schedule of payments over the period of time.

8. The non-transitory computer-readable storage medium of claim 1, wherein the set of user transaction data includes one or more account statements, and wherein the payees include at least one of: an account number or a merchant.

9. The non-transitory computer-readable storage medium of claim 1, wherein the set of user transaction data includes merchant identifiers relating to the payees.

10. A system comprising:
    one or more processors; and
    a computer readable storage medium having instructions stored thereon, which when executed by the one or more processors cause the system to
    categorize payees in a set of user transaction data of a user as a recurring payee or a non-recurring payee based at least in part on a schedule of payments to the payees;
    generate a list of the categorized recurring payees;
    identify recurring payments associated with the categorized recurring payees; and
    in response to the user logging onto an organizational website, update the list of the categorized recurring payees and the associated recurring payments.

11. The system of claim 10, wherein the instructions, when executed by the one or more processors, further cause the system to:
    in response to a triggering event:
      generate, for the user, a report identifying each of the categorized recurring payees; and
      automatically change payment information relating to the user for each of the categorized recurring payees,
      wherein the triggering event is a type of triggering event requiring an account update.

12. The system of claim 11, wherein the instructions, when executed by the one or more processors, further cause the system to:
    issue a replacement payment instrument to the user;
    request the user to activate the replacement payment instrument; and
    display, at a user interface, in connection with the activation of the replacement payment instrument, the report identifying the recurring payees.

13. The system of claim 11, wherein the triggering event is one of: a breach of sensitive information relating to a payment instrument, fraudulent activity relating to the payment instrument, an expiration of the payment instrument, an address change of the user, a name change of the user, an account statement generation, an opening of an account, an opening of a new credit card or line of credit, a reactivation of a card, or information received by an issuing or bill paying organization.

14. The system of claim 10, wherein the instructions, when executed by the one or more processors, further cause the system to:
    receive updated user transaction data;
    detect that one of the categorized recurring payees is no longer a recurring payee based on the updated user transaction data; and
    after a confirmation period, contact the user to confirm that the one of the categorized recurring payees is no longer the recurring payee.

15. The system of claim 10, wherein the set of user transaction data includes a plurality of the schedule of payments over a period of time, wherein categorizing the payees as the recurring payee or the non-recurring payee is further based on the plurality of the schedule of payments over the period of time.

16. The system of claim 15, wherein the recurring payments are identified based on the plurality of the schedule of payments over the period of time.

17. The system of claim 10, wherein the set of user transaction data includes one or more account statements and merchant identifiers relating to the payees, and wherein the payees include at least one of: an account number or a merchant.

18. A method comprising:
    categorizing payees in a set of user transaction data of a user as a recurring payee or a non-recurring payee based at least in part on a schedule of payments to the payees;
    generating a list of the categorized recurring payees;
    identifying recurring payments associated with the categorized recurring payees; and
    in response to the user logging onto an organizational website, updating the list of the categorized recurring payees and the associated recurring payments.

19. The method of claim 18, wherein the method further comprises:
    in response to a triggering event:
      generating, for the user, a report identifying each of the categorized recurring payees; and
      automatically changing payment information relating to the user for each of the categorized recurring payees,
      wherein the triggering event is a type of triggering event requiring an account update.

20. The method of claim 18, wherein the set of user transaction data includes a plurality of the schedule of payments over a period of time, wherein categorizing the payees as the recurring payee or the non-recurring payee is further based on the plurality of the schedule of payments over the period of time, wherein the method further comprises:
    receiving updated user transaction data;
    detecting that one of the categorized recurring payees is no longer a recurring payee based on the updated user transaction data; and after a confirmation period, contacting the user to confirm that the one of the categorized recurring payees is no longer the recurring payee.

\* \* \* \* \*